(12) United States Patent
Murata et al.

(10) Patent No.: US 10,634,574 B2
(45) Date of Patent: Apr. 28, 2020

(54) BALANCE INSPECTION DEVICE

(71) Applicant: IHI Corporation, Koto-ku (JP)

(72) Inventors: Kenkichi Murata, Koto-ku (JP); Seiji Yoshimura, Koto-ku (JP); Tsuyoshi Sato, Koto-ku (JP); Yuki Kurotaki, Koto-ku (JP)

(73) Assignee: IHI Corporation, Koto-ku (JP)

( * ) Notice: Subject to any disclaimer, the term of this patent is extended or adjusted under 35 U.S.C. 154(b) by 85 days.

(21) Appl. No.: 15/563,985

(22) PCT Filed: May 13, 2016

(86) PCT No.: PCT/JP2016/064324
§ 371 (c)(1),
(2) Date: Oct. 3, 2017

(87) PCT Pub. No.: WO2016/186036
PCT Pub. Date: Nov. 24, 2016

(65) Prior Publication Data
US 2018/0136071 A1 May 17, 2018

(30) Foreign Application Priority Data
May 19, 2015 (JP) .................. 2015-101881

(51) Int. Cl.
*G01M 1/16* (2006.01)
*F02B 39/14* (2006.01)
(Continued)

(52) U.S. Cl.
CPC ............... *G01M 1/16* (2013.01); *F02B 37/00* (2013.01); *F02B 39/14* (2013.01); *G01M 1/02* (2013.01); *Y02T 10/144* (2013.01)

(58) Field of Classification Search
CPC . G01M 1/16; G01M 1/02; F02B 39/14; F02B 37/00
See application file for complete search history.

(56) References Cited

U.S. PATENT DOCUMENTS 3,996,912 A * 12/1976 Dreisin ................... F02B 37/00
123/179.21
2001/0039908 A1* 11/2001 Bilek ....................... F01B 1/12
114/55.5
(Continued)

FOREIGN PATENT DOCUMENTS

CN 101012772 A 8/2007
CN 101144745 A 3/2008
(Continued)

OTHER PUBLICATIONS

International Search Report dated Jul. 5, 2016, in PCT/JP2016/064324, filed May 13, 2016.

*Primary Examiner* — Helen C Kwok
(74) *Attorney, Agent, or Firm* — Oblon, McClelland, Maier & Neustadt, L.L.P.

(57) ABSTRACT

A balance inspection device includes a bearing housing in which a bearing supporting a rotary shaft is provided, a jig that is disposed on one side of the bearing housing in a direction of a rotation axis and houses an impeller in an impeller housing space formed therein, a spray nozzle that is provided on the jig and includes a tip opened to the impeller housing space, and a gas supply unit that supplies gas to the spray nozzle. The spray nozzle is adapted to spray the gas from the tip while the gas supplied from the gas supply unit has a circumferential component opposite to a rotational direction of the impeller.

18 Claims, 6 Drawing Sheets

(51) Int. Cl.
*G01M 1/02* (2006.01)
*F02B 37/00* (2006.01)

(56) References Cited

U.S. PATENT DOCUMENTS

| | | | |
|---|---|---|---|
| 2005/0132984 A1* | 6/2005 | Fuerlinger | B64D 27/04 |
| | | | 123/54.1 |
| 2007/0175216 A1 | 8/2007 | Kobayashi | |
| 2008/0060434 A1 | 3/2008 | Kershaw | |
| 2008/0289416 A1 | 11/2008 | Thelen | |
| 2009/0183556 A1 | 7/2009 | Shimizu et al. | |
| 2010/0191380 A1* | 7/2010 | Maeda | G01M 1/02 |
| | | | 700/280 |
| 2013/0067911 A1 | 3/2013 | Worden et al. | |
| 2013/0071243 A1* | 3/2013 | Kocher | F01D 25/18 |
| | | | 415/230 |

FOREIGN PATENT DOCUMENTS

| | | | |
|---|---|---|---|
| CN | 101305272 A | 11/2008 | |
| CN | 103797346 A | 5/2014 | |
| JP | 61-40530 A | 2/1986 | |
| JP | 62-91629 A | 4/1987 | |
| JP | 1-120639 U | 8/1989 | |
| JP | 2000-297798 A | 10/2000 | |
| JP | 2000-329636 A | 11/2000 | |
| JP | 2007-183203 A | 7/2007 | |
| JP | 2008-303854 A | 12/2008 | |
| JP | 2012-2162 A | 1/2012 | |
| JP | 2014-218903 A | 11/2014 | |

\* cited by examiner

BALANCE INSPECTION DEVICE

TECHNICAL FIELD

The present disclosure relates to a balance inspection device that inspects the balance of a rotating body including an impeller.

BACKGROUND ART

For example, the measurement of vibration and the correction of imbalance are performed in a process for manufacturing a turbocharger to confirm the rotation performance of a rotating body. A system disclosed in Patent Document 1 is known as this technique. This system is a system that corrects the imbalance of a rotor of the turbocharger. The semi-assembled turbocharger of which the rotor and a bearing housing supporting the rotor are integrated with each other is mounted on a mount, a mounting housing, or the like.

This system is provided with a vibration detector that detects the vibration of the rotor and a pulse detector that detects the rotational speed of the rotor. When the imbalance of the rotor is to be corrected, a turbine rotor stored in the mounting housing is rotated by the supply of air to the mounting housing and the rotor is rotated. Further, data output from the detector is input to a computer and the contents of the correction of the imbalance are obtained on the basis of the data.

CITATION LIST

Patent Literature

Patent Document 1: Japanese Unexamined Patent Publication No. 2000-329636

SUMMARY OF INVENTION

Technical Problem

During a tracking operation, a balance inspection device stops the supply of air and stops the device by an inertial operation after a rotating body reaches the maximum rotational speed. Time, which is taken until the rotation of a rotating body is stopped, varies depending on the type of an object to be inspected, the amount of initial imbalance, and the like but is long to some extent. When a tracking operation is performed on one object to be inspected multiple times, time required for stopping rotation is also increased as that much. As a result, a total of machine time (abbreviated as M.T.) is increased. This disclosure describes a balance inspection device that can shorten machine time.

Solution to Problem

An aspect of the disclosure provides a balance inspection device for inspecting the balance of a rotating body of which an impeller is provided at one end of a rotary shaft. The balance inspection device includes a bearing housing in which a bearing supporting the rotary shaft is provided, a jig that is disposed on one side of the bearing housing in a direction of a rotation axis and houses the impeller in an impeller housing space formed therein, a spray nozzle that is provided on the jig and includes a tip opened to the impeller housing space, and a gas supply unit that supplies gas to the spray nozzle. The spray nozzle is adapted to spray the gas from the tip while the gas supplied from the gas supply unit has a circumferential component opposite to a rotational direction of the impeller.

Effects of Invention

According to the aspect of the disclosure, the rotation stop time of the rotating body can be shortened. As a result, machine time can be shortened.

DESCRIPTION OF EMBODIMENTS

An aspect of the disclosure provides a balance inspection device for inspecting the balance of a rotating body of which an impeller is provided at one end of a rotary shaft. The balance inspection device includes a bearing housing in which a bearing supporting the rotary shaft is provided, a jig that is disposed on one side of the bearing housing in a direction of a rotation axis and houses the impeller in an impeller housing space formed therein, a spray nozzle that is provided on the jig and includes a tip opened to the impeller housing space, and a gas supply unit that supplies gas to the spray nozzle. The spray nozzle is adapted to spray the gas from the tip while the gas supplied from the gas supply unit has a circumferential component opposite to a rotational direction of the impeller.

According to the balance inspection device, the spray nozzle is provided on the jig that houses the impeller. The tip of the spray nozzle is opened to the impeller housing space. When gas is supplied to the spray nozzle from the gas supply unit, the gas is sprayed from the tip while having a circumferential component opposite to the rotational direction of the impeller. Accordingly, time required for stopping the rotating body (hereinafter, referred to as rotation stop time) can be shortened by the spray of the gas in comparison with a case in which the rotating body is stopped by an inertial operation. As a result, machine time can be shortened.

In some aspects, the rotating body is a rotating body of a turbocharger of which a turbine impeller and a compressor impeller are provided at both ends of the rotary shaft, the jig is a compressor-side jig that houses the compressor impeller as the impeller, and the spray nozzle is provided on the compressor-side jig, and is adapted to spray the gas from the tip while the gas supplied from the gas supply unit has a circumferential component opposite to a rotational direction of the compressor impeller. In this case, gas is supplied to the turbine-side jig, so that the rotating body is rotated. Since gas is sprayed to the compressor impeller by the gas supply unit and the spray nozzle, the rotation stop time of the rotating body is shortened.

In some aspects, the jig includes a shroud portion that is provided around a blade portion of the impeller and faces the blade portion, a gap is provided between the impeller and a surface of the shroud portion, and a cylindrical body portion of the spray nozzle is disposed in a through hole formed in the shroud portion and the tip of the spray nozzle is received in the through hole without protruding into the gap. According to this structure, since the contact between the tip of the spray nozzle and the impeller is prevented, the blade portion of the impeller is protected.

In some aspects, a cylindrical body portion of the spray nozzle is disposed at a position where the body portion is tangential to the rotation axis of the rotary shaft, and the tip of the spray nozzle is opened to an outer peripheral portion of a blade portion of the impeller. According to this structure, since gas to be sprayed has a larger circumferential component, the impeller can be more effectively stopped.

An embodiment of the disclosure will be described below with reference to drawings. Meanwhile, like elements are denoted by like reference numerals in the description of the drawings and the repeated description thereof will be omitted.

Figure 1:
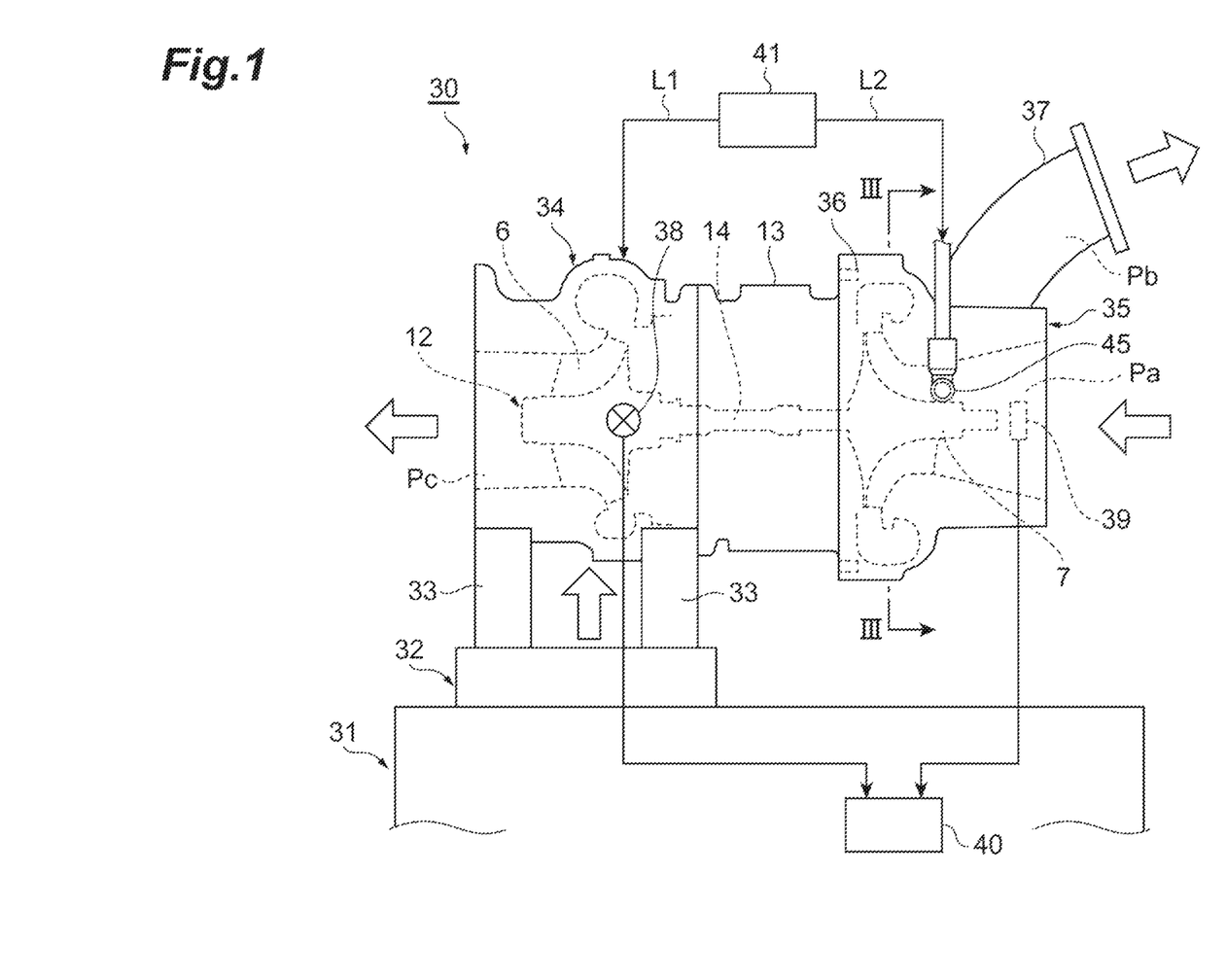
FIG. 1 is a diagram illustrating a schematic structure of a balance inspection device according to an embodiment of the disclosure.

A balance inspection device 30, which inspects the balance of a rotating body 12 of a turbocharger 1, will be described below. As illustrated in FIG. 1, the balance inspection device 30 of this embodiment inspects the balance of the rotating body 12 in a state in which the rotating body 12 is mounted in a bearing housing 13. The balance inspection device 30 performs, for example, an operation using air in the range of a room temperature range. The balance inspection device 30 is adapted to be capable of inspecting the rotational balance of the turbocharger 1 in a high-speed rotation range in which the rotational speed of the turbocharger 1 is 90% or more of the maximum rotational speed thereof. That is, the balance inspection device 30 is a high speed balancer for room-temperature air drive.

Figure 2:
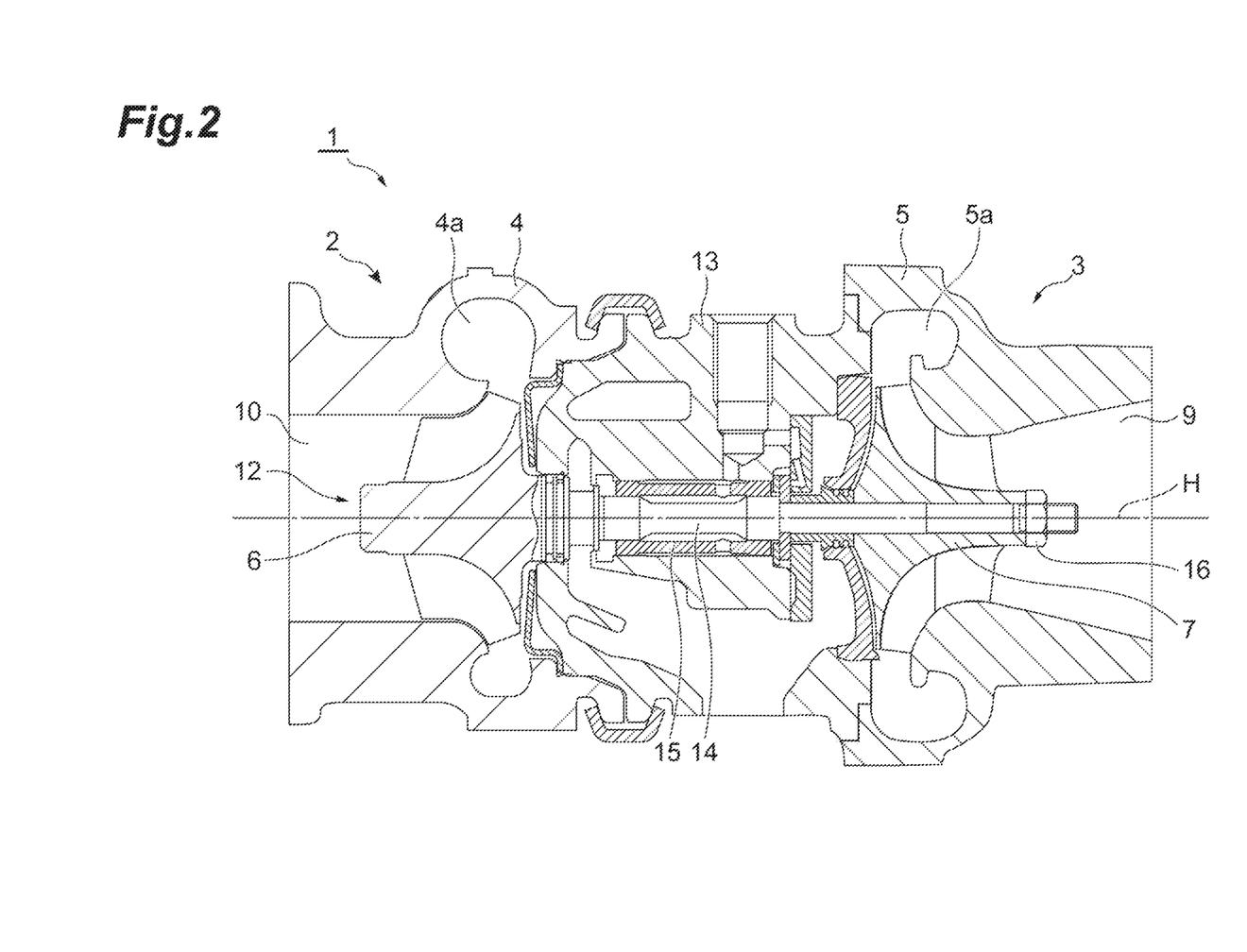
FIG. 2 is a cross-sectional view illustrating a turbocharger as an object to be inspected.

The turbocharger 1, which is an object of which the balance is to be inspected, will be described with reference to FIG. 2. As illustrated in FIG. 2, the turbocharger 1 is applied to an internal combustion engine of a ship or a vehicle. The turbocharger 1 includes a turbine 2 and a compressor 3. The turbine 2 includes a turbine housing 4 and a turbine impeller 6 that is housed in the turbine housing 4. The turbine housing 4 includes a scroll portion 4a that is formed at an inner peripheral edge portion thereof and extends in the circumferential direction. The compressor 3 includes a compressor housing 5 and a compressor impeller 7 that is housed in the compressor housing 5. The compressor housing 5 includes a scroll portion 5a that is formed at an inner peripheral edge portion thereof and extends in the circumferential direction.

The turbine impeller 6 is provided at one end of a rotary shaft 14, and the compressor impeller 7 is provided at the other end of the rotary shaft 14. The compressor impeller 7 is fixed to the rotary shaft 14 by a nut 16 that is provided at the other end of the rotary shaft 14. The bearing housing 13 is provided between the turbine housing 4 and the compressor housing 5. The rotary shaft 14 is rotatably supported by the bearing housing 13 through a bearing 15 that is provided in the bearing housing 13. The rotary shaft 14, the turbine impeller 6, and the compressor impeller 7 rotates about a rotation axis H as the integrated rotating body 12.

The turbine housing 4 is provided with an exhaust gas inlet (not illustrated) and an exhaust gas outlet 10. Exhaust gas (fluid), which is discharged from an internal combustion engine (not illustrated), flows into the turbine housing 4 through the exhaust gas inlet, flows into the turbine impeller 6 through the scroll portion 4a, and rotates the turbine impeller 6. After that, exhaust gas flows to the outside of the turbine housing 4 through the exhaust gas outlet 10.

The compressor housing 5 is provided with an intake port 9 and a discharge port (not illustrated). When the turbine impeller 6 rotates as described above, the compressor impeller 7 rotates through the rotary shaft 14. The rotating compressor impeller 7 takes in outside air through the intake port 9, compresses the outside air, and discharges the compressed air from the discharge port through the scroll portion 5a. The compressed air, which is discharged from the discharge port, is supplied to the above-mentioned internal combustion engine.

Figure 4:
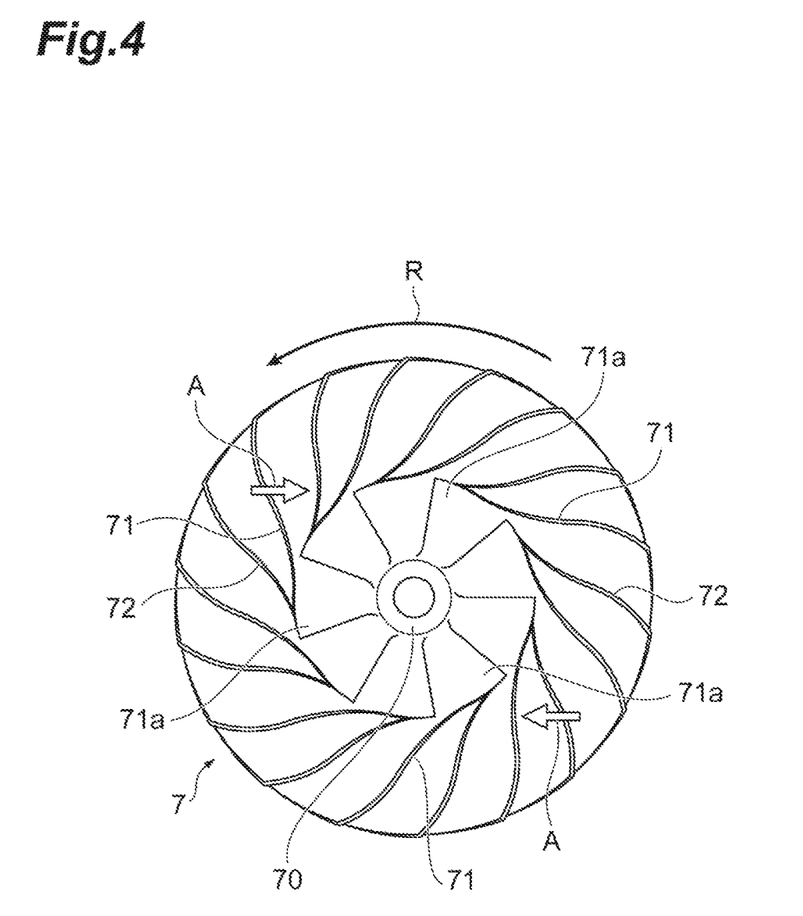
FIG. 4 is a diagram illustrating an impeller in the spray direction of air.

As illustrated in FIG. 4, the compressor impeller 7 includes a hub 70 that is mounted on the rotary shaft 14 and rotates about the rotation axis H, and a plurality of full blades (blade portions) 71 that are arranged in the circumferential direction on the outer peripheral surface of the hub 70. The full blades 71 are arranged on the outer peripheral surface of the hub 70 at regular intervals in the circumferential direction. A plurality of splitter blades 72 are provided between the full blades 71. Meanwhile, the form of the above-mentioned compressor impeller 7 is merely one example. As long as the compressor impeller 7 includes blade portions, the compressor impeller 7 may have other forms.

Subsequently, the balance inspection device 30 will be described with reference to FIG. 1. The balance inspection device 30 includes a turbine-side jig 34 that is mounted on one side (the left side in FIG. 1) of the bearing housing 13 in the direction of the rotation axis H, and a compressor-side jig 35 that is mounted on the other side (the right side in FIG. 1) of the bearing housing 13 in the direction of the rotation axis H. The turbine-side jig 34 has substantially the same shape as the shape of the turbine housing 4 of the turbocharger 1, and houses the turbine impeller 6. The turbine-side jig 34 includes an inflow passage (not illustrated) through which room-temperature air is supplied at high pressure and an outflow passage Pc through which air is discharged.

The compressor-side jig 35 has substantially the same shape as the shape of the compressor housing 5 of the turbocharger 1, and houses the compressor impeller 7 in an impeller housing space S (see FIG. 3) formed therein. The compressor-side jig 35 includes an intake flow passage Pa in which air is taken, a scroll portion 35a (see FIG. 3) that serves as a flow passage for compressed air, and a discharge pipe 37 and a discharge flow passage Pb through which compressed air is discharged. The scroll portion 35a corresponds to the scroll portion 5a of the compressor 3.

When the balance of the rotating body 12 is to be inspected, the turbine housing 4 and the compressor housing 5 of the turbocharger 1 are detached and the turbine-side jig 34 and the compressor-side jig 35 are mounted on the bearing housing 13 including the rotating body 12 as described above.

The balance inspection device 30 includes a vibration table 31 that supports the bearing housing 13 through the turbine-side jig 34, and a holding portion 32 that is fixed on the vibration table 31 and holds the turbine-side jig 34. The turbine-side jig 34 is supported on the holding portion 32 through vibration-proof supports 33 including, for example, vibration-proof rubber or the like. An O-ring 36 is provided between the bearing housing 13 and the compressor-side jig 35. Meanwhile, the form and the support structure of a table on which the turbocharger 1 is installed are not limited to this embodiment. Various forms on which the bearing housing 13 of the turbocharger 1 can be installed or fixed can be employed.

The balance inspection device 30 includes an air supply unit (gas supply unit) 41 that supplies high-pressure air to the turbine-side jig 34, and a turbine-drive-air supply line L1 that is connected to the air supply unit 41. The air supply unit 41 includes an air compressor, a valve or the like that opens and closes a flow passage of the turbine-drive-air supply line L1, and a controller that controls the opening and closing of the valve or the like. The turbine-drive-air supply line L1 is connected to the inflow passage of the above-mentioned turbine-side jig 34.

The balance inspection device 30 further includes an acceleration pickup 38, a rotation detector 39, and a calculation unit 40. The acceleration pickup 38 is mounted on the turbine-side jig 34 by, for example, a magnet. The acceleration pickup 38 detects the acceleration (vibration) of the rotating body 12 during the high-speed rotation of the rotating body 12. The rotation detector 39 is installed near the compressor impeller 7. The rotation detector 39 detects the amount of imbalance of the compressor impeller 7 during the high-speed rotation of the rotating body 12.

The calculation unit 40 is electrically connected to the acceleration pickup 38 and the rotation detector 39. The calculation unit 40 calculates the amount of cut and the like of the nut 16 on the basis of data that is detected by the acceleration pickup 38 and the rotation detector 39. The balance inspection device 30 includes a grinding machine (not illustrated) on the lateral side of the vibration table 31, and corrects the imbalance of the rotating body 12 by grinding the nut 16 with the grinding machine. As described above, the balance inspection device 30 also has a function as a device for correcting the rotating body 12. Meanwhile, the calculation unit 40 may calculate the amount of cut and the like of the compressor impeller 7, and a part of the compressor impeller 7 may be ground by the grinding machine.

The balance inspection device 30 of this embodiment is provided with spray nozzles 45 that shorten the rotation stop time of the rotating body 12 during inspection (during a tracking operation) in which the rotating body 12 is rotated at a high speed. In this embodiment, two spray nozzles 45 are mounted on the compressor-side jig 35. The spray nozzles 45 are connected to the air supply unit 41 through the impeller-stop-air supply lines L2. The air supply unit 41 includes valves or the like that open and close flow passages of the impeller-stop-air supply lines L2, and a controller that controls the opening and closing of the valves or the like. Meanwhile, a supply source of air that is supplied through the turbine-drive-air supply line L1 and a supply source of air that is supplied through the impeller-stop-air supply lines L2 may be provided separately.

Figure 3:
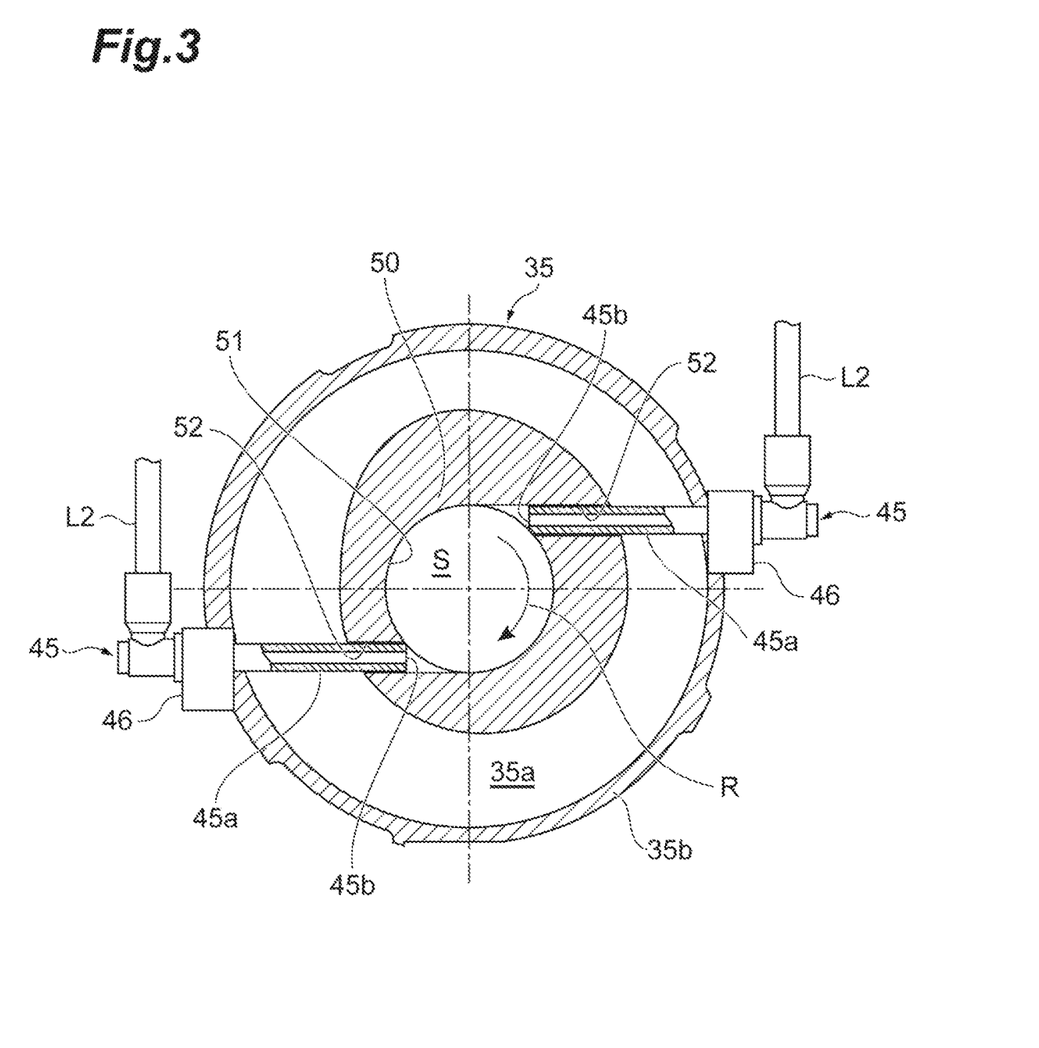
FIG. 3 is a cross-sectional view taken along line III-III of FIG. 1.

As illustrated in FIGS. 1 and 3, each of the spray nozzles 45 is fixed to an outer wall portion 35b of the compressor-side jig 35. In more detail, each spray nozzle 45 includes a cylindrical nozzle body 45a, and the nozzle body 45a is provided so as to penetrate the outer wall portion 35b. Tapping is performed on the outer wall portion 35b, and the nozzle bodies 45a are inserted into the tap portions. Mounting plates 46 are bolted to the outer wall portion 35b, and the nozzle bodies 45a are fixed to the mounting plates 46 by welding or the like. A seal member or the like may be provided between the nozzle body 45a and the tap portion.

As illustrated in FIG. 3, the compressor-side jig 35 includes a shroud portion 50 formed therein. The shroud portion 50 is formed around the compressor impeller 7. The impeller housing space S is formed on the inner peripheral side of the shroud portion 50, and the scroll portion 35a is formed on the outer peripheral side of the shroud portion 50. The shroud portion 50 faces the compressor impeller 7.

The nozzle bodies 45a cross, for example, the scroll portion 35a and are disposed in through holes 52 formed in the shroud portion 50. The center axis of each through hole 52 is disposed at a position where the center axis of each through hole 52 is tangential to the rotation axis H. In other words, the center axis of each through hole 52 is disposed so as to cross the outer peripheral portion of the compressor impeller 7 without crossing the rotation axis H. A direction directed from a base end of the nozzle body 45a, which is provided in the through hole 52, to a tip 45b is a direction opposite to a tangent that corresponds to a forward direction with respect to the rotational direction R of the compressor impeller 7.

Figure 5:
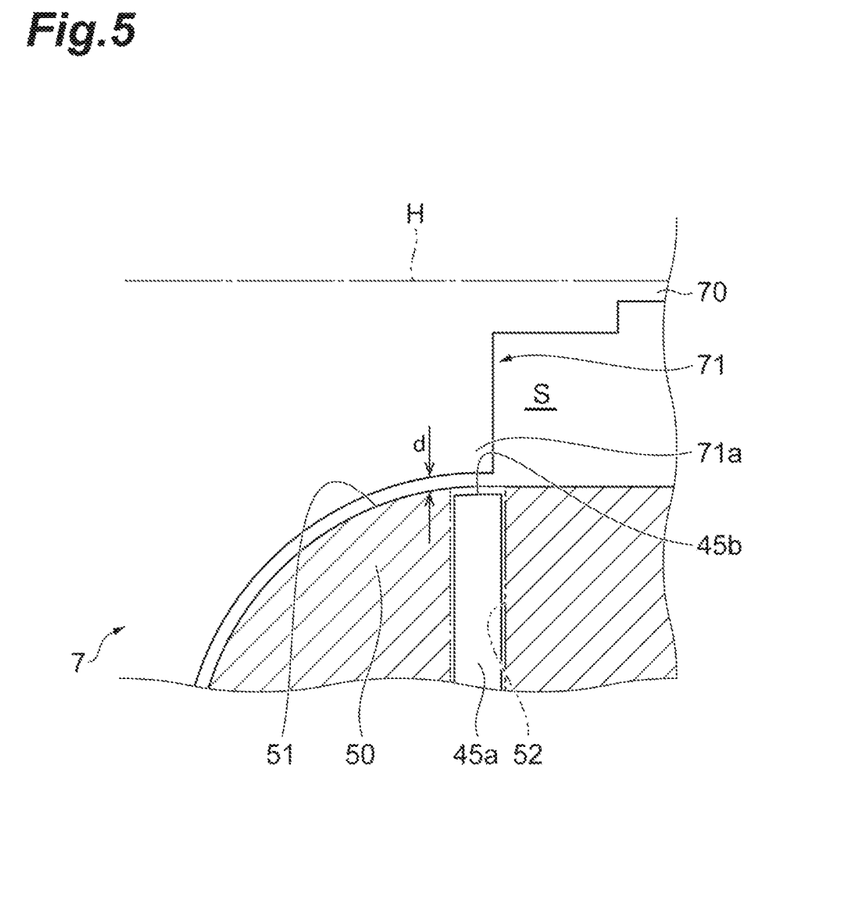
FIG. 5 is a diagram illustrating a distance between a blade portion of the impeller and a nozzle tip.

As shown in FIG. 5, a gap d as a clearance, which extends in a curved shape, is provided between a shroud surface 51 that is the surface of the shroud portion 50 and the outer peripheral edge of a full blade 71. The tip 45b of the nozzle body 45a is received in the through hole 52 and does not protrude into the gap d. The tip 45b of the nozzle body 45a is disposed at a position that is more distant from the rotation axis H than the shroud surface 51, and is opened to the impeller housing space S. The tip 45b is opened toward a front end portion 71a of the full blade 71.

When air is supplied to the spray nozzles 45 having the above-mentioned structure from the air supply unit 41 through the impeller-stop-air supply lines L2, the air is sprayed from the tips 45b while having a circumferential component opposite to the rotational direction R. In this way, the spray nozzles 45 apply air pressure in a direction in which air stops the rotation of the compressor impeller 7 by spraying air to the front end portions 71a of the full blades 71 so as to be opposed to the rotational direction R (see directions of arrows A illustrated in FIG. 4). The spray nozzle 45 is a so-called reverse jet nozzle.

As illustrated in FIG. 3, two spray nozzles 45 are disposed so as to be symmetric with respect to the rotation axis H. In other words, the two spray nozzles 45 are provided two-rotation symmetrically. Accordingly, the compressor impeller 7 is adapted to receive air, which is sprayed from the spray nozzles 45, at positions having a phase difference of 180°.

In the balance inspection device 30, a timing at which air is supplied to the inflow passage of the turbine-side jig 34 and a timing at which air is sprayed from the spray nozzle 45 are switched by the control of the opening and closing of the valves of the air supply unit 41.

Next, methods of inspecting and correcting the rotational balance of the turbocharger 1 by using the balance inspection device 30 will be described. First, the rotating body 12 and the bearing housing 13 are set on the balance inspection device 30. The air supply unit 41 supplies high-pressure air, which has a room temperature, to the inflow passage of the turbine-side jig 34 through the turbine-drive-air supply line L1. The rotating body 12 (the turbine impeller 6, the compressor impeller 7, and the rotary shaft 14) is rotated at a high speed by the supply of the high-pressure air. Air, which is supplied to the turbine-side jig 34, flows to the outside of the turbine-side jig 34 through the outflow passage Pc. On the other hand, when the turbine impeller 6 is rotated, air is taken in through the intake flow passage Pa and is compressed. Compressed air is discharged to the outside through the scroll portion 35a and the discharge flow passage Pb.

Figure 6:
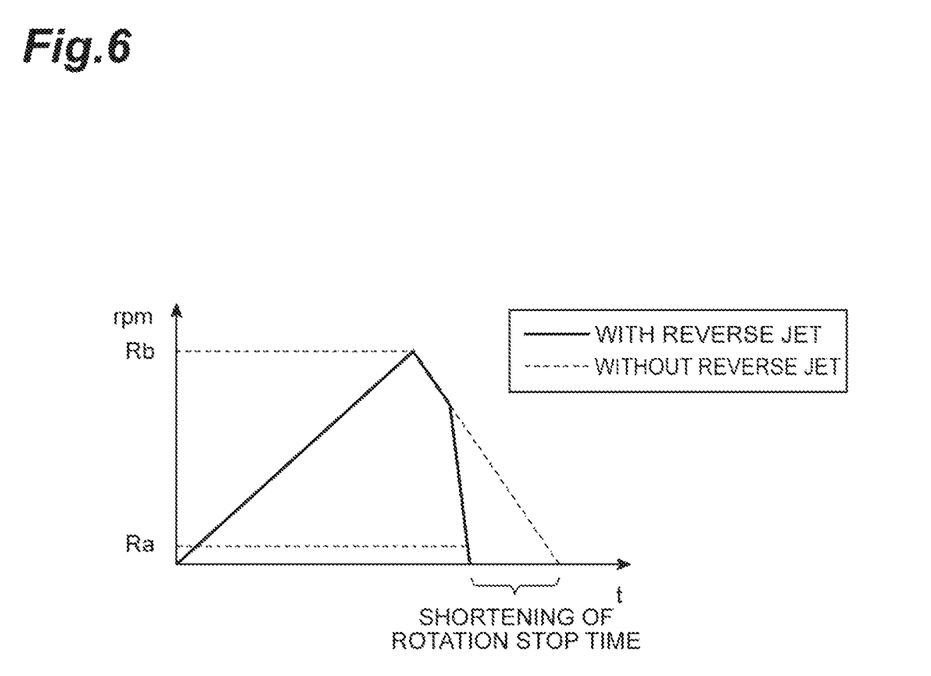
FIG. 6 is a diagram illustrating the change of the rotational speed of a rotating body with respect to time.

As illustrated in FIG. 6, acceleration (vibration) and a phase are detected by the acceleration pickup 38 after the rotating body 12 reaches a predetermined rotational speed Rb at which the amount of imbalance is measured. Further, the rotation angle of the rotating body 12 is detected by the rotation detector 39, so that the amount of imbalance of the compressor impeller 7 is detected.

At this time, the air supply unit 41 stops the supply of air to the inflow passage of the turbine-side jig 34 by closing the valve provided on the turbine-drive-air supply line L1. When the valve provided on the turbine-drive-air supply line L1 is fully closed, the air supply unit 41 supplies air to the spray nozzles 45 by opening the valves provided on the impeller-stop-air supply lines L2. The air supply unit 41 continues to supply air to the spray nozzles 45 for a predetermined time. The rotating body 12 receives air pressure from the spray nozzles 45 at the compressor impeller 7 in addition to an inertial operation. Accordingly, the rotation stop time of the rotating body 12 is shortened.

When a rotational speed detected by the rotation detector 39 reaches a certain rotational speed Ra, the air supply unit 41 stops the supply of air to the spray nozzles 45 by closing the valves provided on the impeller-stop-air supply lines L2.

The calculation unit 40 calculates the amount of cut and the like of the nut 16 on the basis of these detected data. The results of the calculation are output to a display, a printer, or the like (not illustrated). The balance inspection device 30 corrects the rotational balance on the basis of the results of the calculation. Specifically, the balance inspection device 30 grinds the nut 16 or a part of the compressor impeller 7.

After the above-mentioned processes are repeated one or multiple times and it is confirmed that acceleration is equal to or lower than an allowable value, an inspection process and a correction process end and the rotating body 12 and the bearing housing 13 are detached from the balance inspection device 30.

According to the balance inspection device, the spray nozzles 45 are provided on the compressor-side jig 35 that houses the compressor impeller 7. The tip 45b of each spray nozzle 45 is opened to the impeller housing space S. When air is supplied to the spray nozzles 45 from the air supply unit 41, the air is sprayed from the tips 45b while having a circumferential component opposite to the rotational direction R of the compressor impeller 7. Rotation stop time required for stopping the rotating body 12 is shortened by the spray of the air in comparison with a case in which the rotating body 12 is stopped by an inertial operation.

As illustrated in FIG. 6, in a case which is illustrated by a solid line and in which there is reverse jet, time required until the stop of rotation is shortened in comparison with a case which is illustrated by a broken line and in which there is no reverse jet. For example, when the number of times of a tracking operation is multiple times, such as 3 to 4 times, machine time is significantly reduced in comparison with a case in which there is no reverse jet. According to the balance inspection device 30, machine time can be shortened as described above. Accordingly, the balance inspection device 30 is very advantageous in production.

The spray nozzles 45 are provided on the compressor-side jig 35, and the rotating body 12 is rotated by the supply of air to the turbine-side jig 34. Since air is sprayed to the compressor impeller 7 by the air supply unit 41 and the spray nozzles 45, the rotation stop time of the rotating body 12 of the turbocharger 1 is shortened. Particularly, since an influence of the spray of air on the measurement of vibration can be reduced to the minimum in the balance inspection device 30 of which the turbine-side jig 34 is mounted on the vibration-proof supports 33 and the compressor-side jig 35 is mounted on the bearing housing 13 through the O-ring 36, the structure of this embodiment is advantageous.

Since the nozzle bodies 45a of the spray nozzles 45 are disposed in the through holes 52 formed in the shroud portion 50 and the tips 45b of the spray nozzles 45 are received in the through holes 52 without protruding into the gap d, the contact between the tips 45b of the spray nozzles 45 and the compressor impeller 7 is prevented. Accordingly, the full blades 71 of the compressor impeller 7 and the like are protected. Further, the through holes 52 can also be used as guide flow passages for sprayed air.

The nozzle bodies 45a of the spray nozzles 45 are disposed at positions where the nozzle bodies 45a are tangential to the rotation axis H, and the tips 45b thereof are opened to the front end portions 71a of the full blades 71 of the compressor impeller 7. Since a direction directed from the base end of the nozzle body 45a to the tip 45b is a direction opposite to a tangent that corresponds to a forward direction with respect to the rotational direction R of the compressor impeller 7, air to be sprayed has a larger circumferential component. Accordingly, since rotation torque opposite to the rotational direction R of the compressor impeller 7 is increased, the compressor impeller 7 can be more effectively stopped.

The embodiment of the disclosure has been described above, but the invention is not limited to the embodiment. For example, the number of the spray nozzles 45 is not limited to two, and only one spray nozzle 45 may be provided and three or more spray nozzles 45 may be provided in the circumferential direction. The tips of the spray nozzles 45 may slightly protrude into the gap d between the shroud surface 51 and the compressor impeller 7. In a case in which a plurality of spray nozzles 45 are provided, the plurality of spray nozzles 45 may not be symmetric with respect to the rotation axis H. Gas, which is supplied by the gas supply unit, is not limited to air and may be, for example, nitrogen gas or the like.

The spray nozzle is not limited to a separate nozzle fixed to the compressor-side jig 35 as described above, and may be formed of a flow passage formed in the compressor-side jig 35. In this case, a linear or curved flow passage (nozzle body portion) may be formed in the compressor-side jig 35 so that a spray flow having a circumferential component for stopping the impeller is generated. The nozzle body portion may be formed in a direction (that is, a radial direction) crossing the rotation axis H. In this case, the tip of the nozzle body portion may be widened in a tapered shape so that gas to be sprayed has a circumferential component opposite to the rotational direction R.

The turbocharger as an object to be inspected may be an electric turbocharger. The invention is not limited to a case in which the turbine impeller 6 and the compressor impeller 7 are provided on the rotary shaft 14, and only the compressor impeller 7 may be provided on the rotary shaft 14. The balance inspection device 30 may be a device that inspects the balance of a rotating body of a rotating machine, such as a compressor, other than a turbocharger. A case in which the balance inspection device 30 is driven by room-temperature air has been described, but the balance inspection device of the invention may be a type using heated air. The balance inspection device of the invention is not limited to a high speed balancer that rotates the rotating body at a rotational speed of 90% or more of the maximum rotational speed thereof, and may be a balancer that rotates a rotating body at a rotational speed of 90% or less of the maximum rotational speed thereof.

The calculation unit 40 may be provided at a position apart from the vibration table 31. In this case, an aspect of a balance inspection system to which detection signals from the acceleration pickup 38 and the rotation detector 39 are sent wirelessly may be employed. Further, a pulsation inspection unit (not illustrated) for inspecting pulsation may be provided as disclosed in Japanese Unexamined Patent Publication No. 2014-218903 so that the inspection of pulsation and the inspection of the balance of the rotating body are simultaneously performed.

INDUSTRIAL APPLICABILITY

According to some aspects of the disclosure, the rotation stop time of the rotating body can be shortened. As a result, machine time can be shortened.

REFERENCE SIGNS LIST

- 1: turbocharger
- 2: turbine
- 3: compressor
- 4: turbine housing
- 5: compressor housing
- 6: turbine impeller
- 7: compressor impeller
- 12: rotating body
- 13: bearing housing
- 14: rotary shaft
- 16: nut
- 30: balance inspection device
- 34: turbine-side jig
- 35: compressor-side jig
- 35*a*: scroll portion
- 41: air supply unit (gas supply unit)
- 45: spray nozzle
- 45*b*: tip
- 50: shroud portion
- 51: shroud surface
- 52: through hole
- 71: full blades (blade portion)
- 71*a*: front end portion (outer peripheral portion)
- 72: splitter blade
- H: rotation axis
- L2: impeller-stop-air supply line
- R: rotational direction

The invention claimed is:

1. A balance inspection device for inspecting the balance of a rotating body of which an impeller is provided at one end of a rotary shaft, the balance inspection device comprising:
   a bearing housing in which a bearing supporting the rotary shaft is provided;
   a jig that is disposed on one side of the bearing housing in a direction of a rotation axis and houses the impeller in an impeller housing space formed therein;
   a spray nozzle that is provided on the jig and includes a tip opened to the impeller housing space; and
   a gas supply unit that supplies gas to the spray nozzle,
   wherein the spray nozzle is adapted to spray a gas from the tip while the gas supplied from the gas supply unit has a circumferential component opposite to a rotational direction of the impeller,
   wherein the jig includes a shroud portion that is provided around a blade portion of the impeller and faces the blade portion, and
   wherein a gap is provided between the impeller and a surface of the shroud portion.

2. The balance inspection device according to claim 1, wherein the rotating body is a rotating body of a turbocharger of which a turbine impeller and a compressor impeller are provided at both ends of the rotary shaft, the jig is a compressor-side jig that houses the compressor impeller as the impeller, and
   the spray nozzle is provided on the compressor-side jig, and is adapted to spray the gas from the tip while the gas supplied from the gas supply unit has a circumferential component opposite to a rotational direction of the compressor impeller.

3. The balance inspection device according to claim 1, further comprising
   a cylindrical body portion of the spray nozzle is disposed in a through hole formed in the shroud portion, and the tip of the spray nozzle is received in the through hole without protruding into the gap.

4. The balance inspection device according to claim 1, wherein a cylindrical body portion of the spray nozzle is disposed at a position where the cylindrical body portion is tangential to the rotation axis of the rotary shaft, and the tip of the spray nozzle is opened to an outer peripheral portion of a blade portion of the impeller.

5. The balance inspection device according to claim 3, wherein the cylindrical body portion of the spray nozzle is disposed at a position where the cylindrical body portion is tangential to the rotation axis of the rotary shaft, and the tip of the spray nozzle is opened to an outer peripheral portion of the blade portion.

6. The balance inspection device according to claim 2, further comprising
   a cylindrical body portion of the spray nozzle is disposed in a through hole formed in the shroud portion, and the tip of the spray nozzle is received in the through hole without protruding into the gap.

7. The balance inspection device according to claim 2, wherein a cylindrical body portion of the spray nozzle is disposed at a position where the cylindrical body portion is tangential to the rotation axis of the rotary shaft, and the tip of the spray nozzle is opened to an outer peripheral portion of a blade portion of the impeller.

8. The balance inspection device according to claim 6, wherein the cylindrical body portion of the spray nozzle is disposed at a position where the cylindrical body portion is tangential to the rotation axis of the rotary shaft, and the tip of the spray nozzle is opened to an outer peripheral portion of the blade portion.

9. The balance inspection device according to claim 1, wherein the spray nozzle includes a cylindrical body portion which penetrates an outer wall portion of the jig, and
   wherein a mounting plate is attached to the outer wall portion of the jig, and the cylindrical body portion is fixed to the mounting plate.

10. The balance inspection device according to claim 3, wherein the rotating body is a rotating body of a turbocharger of which a turbine impeller and a compressor impeller are provided at both ends of the rotary shaft, the jig is a compressor-side jig that houses the compressor impeller as the impeller, and
    the spray nozzle is provided on the compressor-side jig, and is adapted to spray the gas from the tip while the gas supplied from the gas supply unit has a circumferential component opposite to a rotational direction of the compressor impeller.

11. The balance inspection device according to claim 10, wherein the cylindrical body portion of the spray nozzle is disposed at a position where the cylindrical body portion is tangential to the rotation axis of the rotary shaft, and the tip of the spray nozzle is opened to an outer peripheral portion of the blade portion.

12. A balance inspection device for inspecting the balance of a rotating body of which an impeller is provided at one end of a rotary shaft, the balance inspection device comprising:
- a bearing housing in which a bearing supporting the rotary shaft is provided;
- a jig that is disposed on one side of the bearing housing in a direction of a rotation axis and houses the impeller in an impeller housing space formed therein;
- a spray nozzle that is provided on the jig and includes a tip opened to the impeller housing space; and
- a gas supply unit that supplies gas to the spray nozzle,
- wherein the jig includes a shroud portion that is provided around a blade portion of the impeller and faces the blade portion,
- wherein the spray nozzle is adapted to spray a gas from the tip while the gas supplied from the gas supply unit has a circumferential component opposite to a rotational direction of the impeller, and
- wherein a cylindrical body portion of the spray nozzle is disposed in a through hole formed in the shroud portion, and the tip of the spray nozzle is received in the through hole.

13. The balance inspection device according to claim 12, wherein the rotating body is a rotating body of a turbocharger of which a turbine impeller and a compressor impeller are provided at both ends of the rotary shaft, wherein the jig is a compressor-side jig that houses the compressor impeller as the impeller, and wherein the spray nozzle is provided on the compressor-side jig, and is adapted to spray the gas from the tip while the gas supplied from the gas supply unit has a circumferential component opposite to a rotational direction of the compressor impeller.

14. The balance inspection device according to claim 12, wherein the cylindrical body portion of the spray nozzle is disposed at a position where the cylindrical body portion is tangential to the rotation axis of the rotary shaft, and the tip of the spray nozzle is opened to an outer peripheral portion of a blade portion of the impeller.

15. The balance inspection device according to claim 13, further comprising
- a gap is provided between the impeller and a surface of the shroud portion, and
- wherein the cylindrical body portion of the spray nozzle is disposed in a through hole formed in the shroud portion, and the tip of the spray nozzle is received in the through hole without protruding into the gap.

16. The balance inspection device according to claim 13, wherein the cylindrical body portion of the spray nozzle is disposed at a position where the cylindrical body portion is tangential to the rotation axis of the rotary shaft, and the tip of the spray nozzle is opened to an outer peripheral portion of a blade portion of the impeller.

17. The balance inspection device according to claim 15, wherein the cylindrical body portion of the spray nozzle is disposed at a position where the cylindrical body portion is tangential to the rotation axis of the rotary shaft, and the tip of the spray nozzle is opened to an outer peripheral portion of the blade portion.

18. The balance inspection device according to claim 12, wherein the spray nozzle includes a cylindrical body portion which penetrates an outer wall portion of the jig, and wherein a mounting plate is attached to the outer wall portion of the jig, and the cylindrical body portion is fixed to the mounting plate.

* * * * *